Aug. 1, 1967　　　　　　H. C. CUSKIE　　　　　　3,333,866
REAR SUSPENSION FOR A MOTOR VEHICLE

Filed June 17, 1965　　　　　　　　　　　　4 Sheets-Sheet 4

INVENTOR.
HERMAN C. CUSKIE
BY John R. Faulkner
Clifford L. Sadler
ATTORNEYS though the figures show these frame elements as being separate components, the scope of the present invention is broad enough to include vehicle constructions in which the frame members are integrally formed of body sheet metal as well as vehicle structures in which the frame members are separate elements.

United States Patent Office 3,333,866
Patented Aug. 1, 1967

3,333,866
REAR SUSPENSION FOR A MOTOR VEHICLE
Herman C. Cuskie, Birmingham, Mich., assignor to Ford Motor Company, Dearborn, Mich., a corporation of Delaware
Filed June 17, 1965, Ser. No. 464,647
8 Claims. (Cl. 280—124)

ABSTRACT OF THE DISCLOSURE

A motor vehicle suspension system for driving wheels that are interconnected by a rigid axle housing. The axle housing is positioned by two arms; a torque arm that is rigidly connected to the axle housing and a suspension arm that has spaced pivots at the vehicle frame.

---

The present invention relates generally to motor vehicle suspension systems, and more particularly to a rear suspension system having a solid driving axle.

It is the object of any vehicle suspension system to provide an articulted connection between the vehicle's wheels and the chassis so that the wheels may traverse a jounce and rebound path when the vehicle is driven over an irregular surface. The suspension also includes a spring device for resiliently supporting the chassis upon the wheel. In addition to permitting jounce and rebound movement of the wheels with respect to the chassis, a good suspension system will control the path of the wheel so that certain operating features may be realized. For an example, the suspension can control the tendency of the body to lean when the vehicle is cornering, and it can control the tendency of the rear end to lift on braking or to squat on acceleration.

In accordance with the present invention, a suspension system is provided for the rear driving wheels of a motor vehicle having a rigid interconnecting axle housing. The suspension is particularly characterized by its marked simplicity of design while still achieving the suspension geometry advantages of more sophisticated systems.

In particular, it is an object of the present invention to provide an embodiment in a motor vehicle suspension system in which only two arms are used to interconnect the axle housing with the vehicle chassis. One of the arms is rigidly connected to the axle housing and serves as a torque arm and the other arm is pivotally connected to both the axle housing and the chassis and functions as a suspension arm.

The many objects and advantages of the present invention will be more fully comprehended from the following discussion and the accompanying drawings in which.

Figure 1:
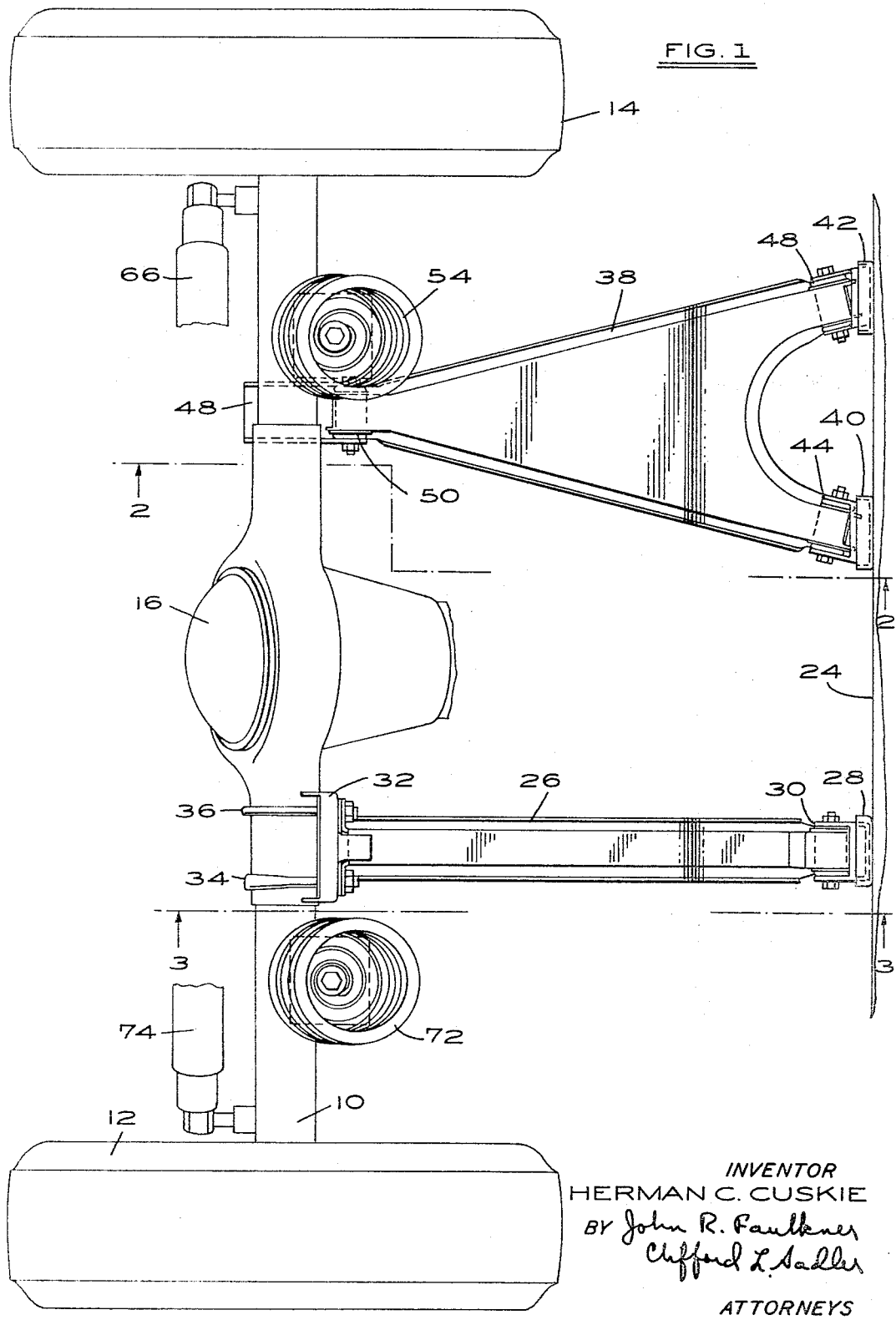
FIGURE 1 is a top plan view of a motor vehicle suspension incorporating the preferred embodiment of this invention.

Reference is now made to the drawings for a detailed understanding of the present invention wherein a transversely extending rigid axle housing 10 rotatably supports a road wheel at each of its outer ends. The wheels are identified by the reference numerals 12 and 14 and are for the right and left hand, respectively, when viewed from the rear facing toward the front of the vehicle. A differential housing 16 is centrally disposed in the axle housing 10 and contains differential gearing for distributing driving torque from a drive shaft 18 through the axle shafts contained in the housing 10 to the driving wheels 12 and 14.

The vehicle frame includes left and right frame side rails 20 and 22 which are interconnected by a transversely extending frame member 24. The vehicle body is supported on the frame members 20 and 22. While the figures show these frame elements as being separate components, the scope of the present invention is broad enough to include vehicle constructions in which the frame members are integrally formed of body sheet metal as well as vehicle structures in which the frame members are separate elements.

A torque arm 26 has its forward end pivotally connected to a bracket 28 that is rigidly secured to the transverse frame member 24. The pivotal connection includes an elastic bushing 30 of the silent block type. The torque arm 26 extends rearwardly to a rigid connection with the axle housing 10. As noted in FIGURE 3, the torque arm 26 has a generally dog leg bent configuration with the center of the elastic pivot 30 being situated forwardly and downwardly from the center of the axle housing 10. A saddle member 32 is positioned against the axle housing 10 and is secured thereto by a pair of U-bolts 34, 36. The U-bolts also extend through the end flange of the torque arm 26. The nut on the ends of the U-bolts 34 and 36 are tightened to the point where a rigid connection is formed between the rear end of the torque arm 26, the saddle 32 and the axle housing 10.

The torque arm 26 interconnects the axle housing 10 and the cross frame member 24 to the right of the center line of the vehicle. Situated to the left and also interconnecting the housing 10 and the frame member 24 is a suspension arm 38 having a generally A-frame shape. The base of the A-frame arm 38 is pivotally connected to a pair of brackets 40 and 42 which are welded to the cross frame member 24. These pivotal connections include elastic bushings 44 and 46 of the silent block type. A bracket 48 is welded to the underside of the axle housing 10 to the left of the differential 16. The bracket 48 provides a support for an elastic bushing 50 which, in turn, provides a pivotal connection for the rear end of the suspension arm 38.

It is to be noted that in the side elevational view, the A-frame suspension arm 38 has a generally dog leg configuration similar to the torque arm 26. The pivot 50 for its connection with the axle housing bracket 48 is situated upwardly and rearwardly of the pivots 44 and 46 joining the forward end of the arm 38 with the frame cross member 24.

The suspension is completed by means providing resilient support for the chassis on the axle housing and by means providing damping of relative movement between those components. A bracket 52 is welded to the axle housing 10 at a point outwardly of the bracket 48. The bracket 52 constitutes a spring seat for a coil type suspension spring 54. The lower end of the spring 54 has a configuration that is known in the art as a "pig's tail" for easy attachment to the bracket 52 by a bolt 56. A sheet metal bracket or support member 58 is secured to the chassis and includes a spring seat portion 60 for connection to the upper end of the coil spring 54. A bracket 62 is welded to the axle housing 10 and extends downwardly and rearwardly therefrom. The bracket 62 is in general lateral alignment with the spring bracket 52.

A cantilever mounting bolt 64 is secured to the bracket 62 and provides support for the lower end of a telescopic hydraulic shock absorber 66. The extending end of the piston rod 68 of the shock absorber 66 is secured to a bracket portion 70 of the support structure 58 by means of a pair of spaced apart resilient bushings.

The structure described in the two preceding paragraphs pertains to the suspension spring and shock absorber for the left-hand side of the axle housing. This same structure is duplicated on the right-hand side where a coil spring 72 is interposed between an axle housing bracket and a support member of the chassis. In addition, the shock absorber 74 interconnects the axle housing 10 and the chassis frame in the general region of the right-hand coil spring 72.

Figure 2:
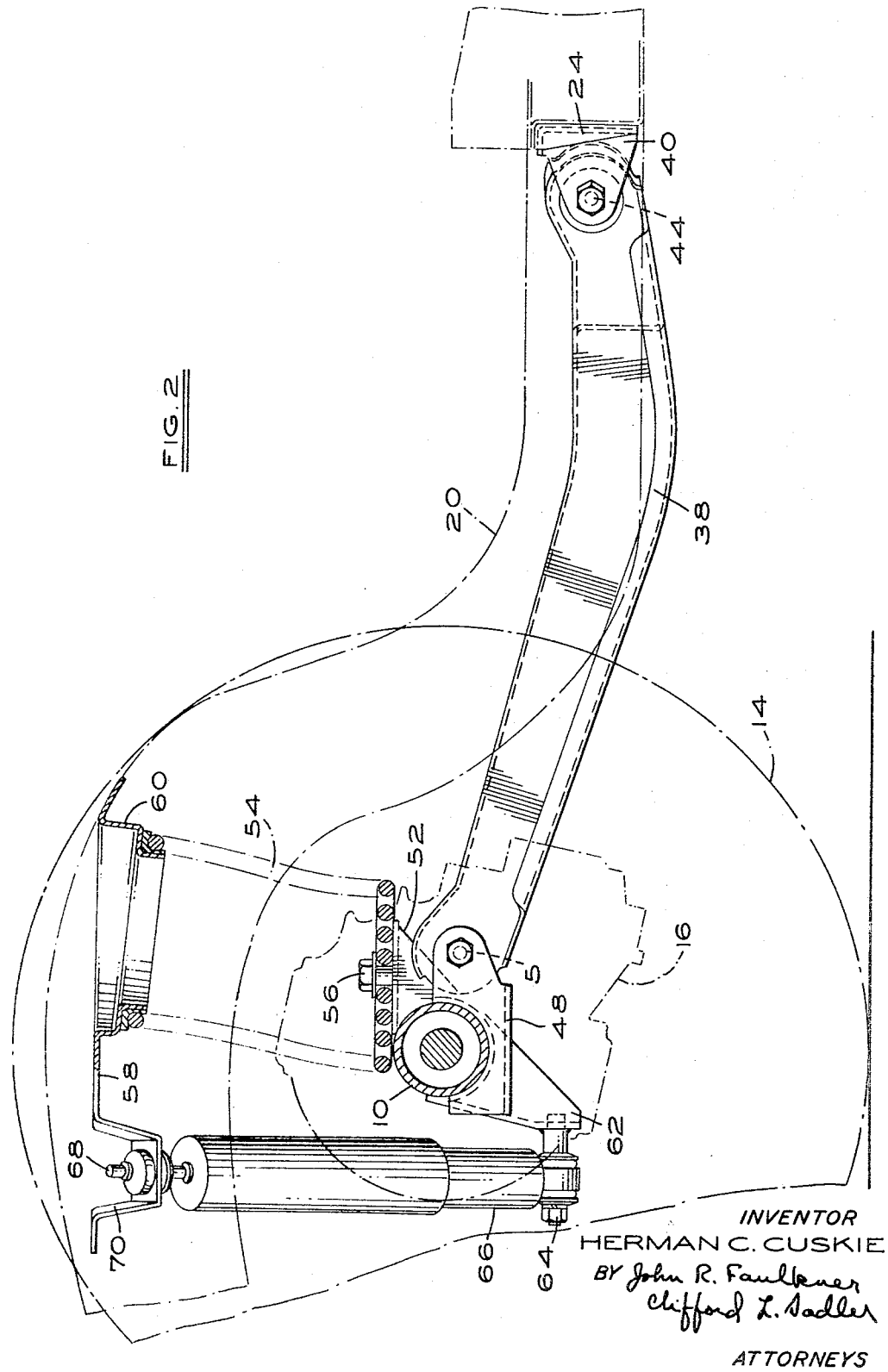
FIGURE 2 is a sectional view taken along section lines 2—2 of FIGURE 1.
Figure 3:
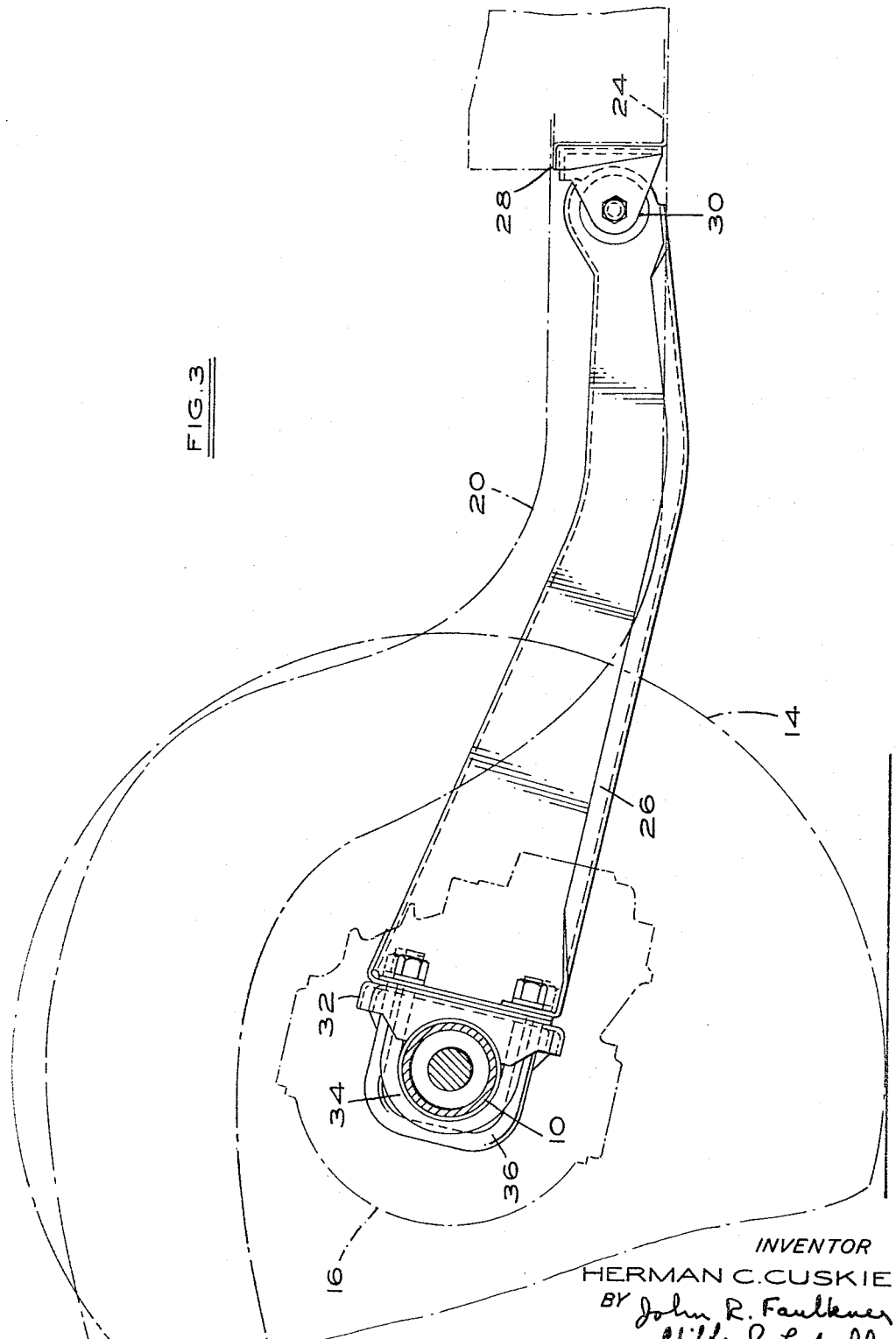
FIGURE 3 is a sectional view taken along section lines 3—3 of FIGURE 1.
Figure 4:
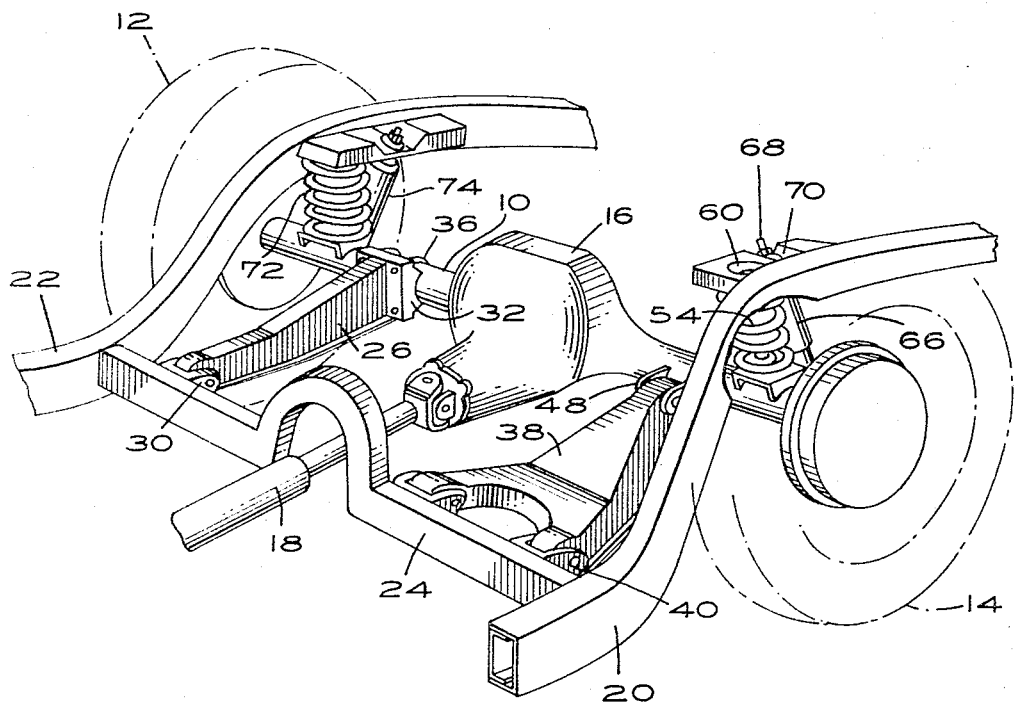
FIGURE 4 is a perspective view of the suspension shown in FIGURES 1, 2 and 3.

Functionally, the just described suspension system can perform as well as suspension systems that employ far greater construction complexities. Due to the rigidity of the arms 26 and 38, the axle housing 10 is precisely located longitudinally with respect to the frame cross member 24. The spaced apart pivots 44 and 46 for the A-frame suspension arm 38 restrain the arm 38 and thus the axle housing 10 against lateral movement. Due to the presence of the rigid connection between the torque arm 26 and the axle housing 10, brake torque reaction and acceleration torque reaction may be transmitted from the wheels through the axle housing to the vehicle's chassis. By positioning the torque and suspension arms 36 and 38 in a downwardlly and forwardly fashion as seen in FIGURES 2 and 3, vertical component forces will be produced during braking and acceleration which will tend to resist the tendency of the vehicle body to lift and squat when it is braked or accelerated. Thus, this suspension system performs all of the primary functions of a vehicle suspension system while employing far fewer than the usual number of parts.

The foregoing description presents the presently preferred embodiment of this invention. Alterations and modifications may occur to those skilled in the art which will come within the scope and spirit of the following claims.

I claim:

1. A motor vehicle suspension system comprising a chassis frame member, a rigid axle housing member, a road wheel positioned at each of the outer ends of said axle housing, and suspension means interconnecting said axle housing member and said frame member, said suspension means comprising a torque arm having a rigid connection at its rearward end with said axle housing member and a pivotal connection at its forward end with said frame member, a suspension arm having a pivotal connection with said axle housing member at its rearward end and a pivotal connection at its forward end with said frame member, said suspension arm having a generally A-shaped configuration in the plan view with the apex pivotally connected to one of said members and its base portion pivotally connected to the other of said members by a pair of laterally spaced apart pivots.

2. A motor vehicle suspension system comprising a chassis frame member, a rigid axle housing, a road wheel positioned at each of the outer ends of said axle housing, and suspension means interconnecting said axle housing and said frame member, said suspension means comprising a torque arm having a rigid connection at its rearward end with said axle housing and a pivotal connection at its forward end with said frame member, a suspension arm having a pivotal connection with said axle housing at its rearward end and a pivotal connection at its forward end with said frame member, said suspension arm having a generally A-shaped configuration in the plan view with its apex pivotally connected to the axle housing and its base portion pivotally connected to said frame member by a pair of laterally spaced apart pivots.

3. A motor vehicle suspension system comprising a chassis frame member, a rigid axle housing member, a road wheel positioned at each of the outer ends of said axle housing member, and suspension means interconnecting said axle housing member and said frame member, said suspension means comprising a torque arm having a rigid connection at its rearward end with said axle housing member and a pivotal connection at its forward end with said frame member, a suspension arm having a pivotal connection with said axle housing member at its rearward end and a pivotal connection at its forward end with said frame member, said suspension arm having a generally A-shaped configuration in the plan view with the apex pivotally connected to one of said members and its base portion pivotally connected to the other of said members by a pair of laterally spaced apart pivots, the center of said axle housing member being situated upwardly and rearwardly of the pivotal connections between said arms and said frame member, coil springs interposed between said axle housing and said frame member.

4. A motor vehicle suspension system comprising a chassis frame member, a rigid axle housing, a road wheel positioned at each of the outer ends of said axle housing, and suspension means interconnecting said axle housing and said frame member, said suspension means comprising a torque arm having a rigid connection at its rearward end with said axle housing and a pivotal connection at its forward end with said frame member, a suspension arm having a pivotal connection with said axle housing at its rearward end and a pivotal connection at its forward end with said frame member, said suspension arm having a generally A-shaped configuration in the plan view with its apex pivotally connected to the axle housing and its base portion pivotally connected to said frame member by a pair of laterally spaced apart pivots, the center of said axle housing being situated upwardly and rearwardly of the pivotal connections between said arms and said frame member, coil springs interposed between said axle housing and said frame.

5. A motor vehicle suspension system comprising a chassis frame member, a rigid axle housing, a road wheel positioned at each of the outer ends of said axle housing, and suspension means interconnecting said axle housing and said frame, said suspension means comprising a longitudinally extending torque arm having a rigid connection at one of its ends with said axle housing, a bushing connecting the other end of said torque arm to said frame member, a suspension arm, first pivot means connecting said axle housing to said suspension arm at one of its ends, second pivot means connecting the other end of said suspension arm to said frame member and constructed to restrict movement of said suspension arm to pivotal movement about a horizontal axis.

6. A motor vehicle suspension system for driving wheels comprising a chassis frame member, a rigid axle housing, a road wheel positioned at each of the outer ends of said axle housing, a differential gear means interposed in said axle housing and constructed to distribute driving torque to said wheels, and suspension means interconnecting said axle housing and said frame, said suspension means comprising a longitudinally extending torque arm having a rigid connection at one of its ends with said axle housing, a bushing connecting the other end of said torque arm to said frame member, a suspension arm, first pivot means connecting said axle housing to said suspension arm at one of its ends, second pivot means connecting the other end of said suspension arm to said frame member and constructed to restrict movement of said suspension arm to pivotal movement about a horizontal axis.

7. A motor vehicle suspension system for comprising a chassis frame member, a rigid axle housing a road wheel positioned at each of the outer ends of said axle housing, said suspension means interconnecting said axle housing and said frame, said suspension means comprising a longitudinally extending torque arm having a rigid connection at one of its ends with said axle housing, an elastic bushing connecting the other end of said torque arm to said frame member, a suspension arm having a pivotal connection with said axle housing at one of its ends, laterally spaced elastic pivot means connecting the other end of said suspension arm to said frame member and constructed to restrict movement of said suspension arm to pivotal movement about a horizontal axis.

8. A motor vehicle suspension system for driving wheels comprising a chassis frame member, a rigid axle housing, a road wheel positioned at each of the outer ends of said axle housing, a differential gear means interposed in said axle housing and constructed to distribute driving torque to said wheels, and suspension means interconnecting said axle housing and said frame, said suspension means comprising a longitudinally extending torque arm having a rigid connection at one of its ends with said axle housing, an elastic bushing connecting the other end of said torque arm to said frame member, a suspension arm having a pivotal connection with said axle housing at one of its ends, laterally spaced elastic pivot means connecting the other end of said suspension arm to said frame member and constructed to restrict movement of said suspension arm to pivotal movement about a horizontal axis.

References Cited

UNITED STATES PATENTS 2,877,023   3/1959   Shaffer _____ 280—104.5

BENJAMIN HERSH, *Primary Examiner.*

P. GOODMAN, *Assistant Examiner.*